US012611735B2

(12) United States Patent
Lualdi

(10) Patent No.: US 12,611,735 B2
(45) Date of Patent: Apr. 28, 2026

(54) AUTOMATED LASER CUTTING STATION FOR THE PRODUCTION OF SEMIFINISHED COMPONENTS, SEMI-FINISHED COMPONENT AND RELATIVE PRODUCTION METHOD

(71) Applicant: HPF S.R.L., Fagagna (IT)

(72) Inventor: Gabriele Lualdi, Fagagna (IT)

(73) Assignee: HPF S.R.L., Fagagna (IT)

( * ) Notice: Subject to any disclaimer, the term of this patent is extended or adjusted under 35 U.S.C. 154(b) by 0 days.

(21) Appl. No.: 17/396,654

(22) Filed: Aug. 6, 2021

(65) Prior Publication Data

US 2022/0040798 A1 Feb. 10, 2022

(30) Foreign Application Priority Data

Aug. 6, 2020 (IT) ......................... 102020000019405

(51) Int. Cl.
B23K 26/384 (2014.01)
B23K 26/03 (2006.01)
(Continued)

(52) U.S. Cl.
CPC ........... B23K 26/384 (2015.10); B23K 26/03 (2013.01); B23K 26/0823 (2013.01); B23K 26/0884 (2013.01); B23K 37/04 (2013.01)

(58) Field of Classification Search
CPC ........... A61B 17/1659; A61B 17/1666; A61B 17/1668; A61B 17/1677; A61B 17/1684; A61B 2017/00526; B23K 26/03; B23K 26/0823; B23K 26/0884; B23K 26/127; B23K 26/38; B23K 26/384; B23K 37/04; B23K 26/08; B23K 2101/006; B23K 26/032; B23K 26/082; B23K 26/382; B23K 2101/18; B23K 26/0622; B23K 26/364; B23K 26/702; B23K 37/00; B23K 101/00; B23K 101/18; B23K 26/02; B23K 26/042;
(Continued)

(56) References Cited

U.S. PATENT DOCUMENTS 7,981,770 B2 * 7/2011 Kaneko .................. B23K 26/53
438/460
9,468,992 B2 * 10/2016 Vogt ................... B23K 26/0861
(Continued)

FOREIGN PATENT DOCUMENTS

CA 2509513 C * 1/2013 ............ B23P 19/041
EP 2 412 322 A1 2/2012
(Continued)

OTHER PUBLICATIONS

Search Report issued in IT 202000019405, dated Apr. 26, 2021.

*Primary Examiner* — Edward F Landrum
*Assistant Examiner* — Adam M Eckardt
(74) *Attorney, Agent, or Firm* — MARSHALL, GERSTEIN & BORUN LLP

(57) ABSTRACT

An automated laser cutting station for the production of semi-finished components for prosthetic surgery instruments able, in use, to carry out tissue removal processes. Said automated station comprises at least a first automated operator, a laser cutting apparatus, and a control unit. The present invention also relates to a relative method for the production of such a semi-finished component, and to the semi-finished component thus obtained.

9 Claims, 4 Drawing Sheets

(51) Int. Cl.
  *B23K 26/08* (2014.01)
  *B23K 37/04* (2006.01)
(58) Field of Classification Search
  CPC .......... B23K 26/70; G01H 1/00; G01H 17/00;
      G01N 29/14; B25J 9/0084; B25J 9/00;
      B60R 21/2165; G01B 11/00
  See application file for complete search history.

(56) References Cited

U.S. PATENT DOCUMENTS

| | | | | |
|---|---|---|---|---|
| 2013/0245628 A1* | 9/2013 | Sidebotham | ....... | A61B 17/1666 |
| | | | | 219/121.64 |
| 2018/0056440 A1* | 3/2018 | Yamamoto | ........... | B23K 26/032 |
| 2019/0054572 A1* | 2/2019 | Parvis | ................. | B23K 26/382 |
| 2019/0229005 A1* | 7/2019 | Tanaka | ................. | H01L 21/681 |

FOREIGN PATENT DOCUMENTS

| | | | | | |
|---|---|---|---|---|---|
| TW | M426869 | U | * | 4/2012 | |
| TW | 201249583 | A | * | 12/2012 | ........... B23K 26/146 |
| WO | WO-2007091155 | A1 | * | 8/2007 | ......... A61C 13/0018 |

* cited by examiner

AUTOMATED LASER CUTTING STATION FOR THE PRODUCTION OF SEMIFINISHED COMPONENTS, SEMI-FINISHED COMPONENT AND RELATIVE PRODUCTION METHOD

FIELD OF THE INVENTION

The present invention relates to an automated station for the production of semi-finished components for prosthetic surgery instruments, in particular components which, once finished, are able to mill/cut or otherwise carry out tissue removal processes in preparation for, or in the context of, prosthetic surgery operations, in this case in the orthopaedic field.

The present invention also relates to the relative method to produce such a semi-finished component, and to the semi-finished component thus obtained.

BACKGROUND

In general, prosthetic surgery instruments are known which are able to remove bone tissues by milling, cutting, abrasion and shaped to produce coordinated and conjugated bone sites suitable for the arrangement and implantation of relative components of surgical prostheses. Such instruments may be, for example, acetabular cutters, patellar cutters, glenoid cutters, rasps, broaches or similar or comparable instruments.

The aforementioned known instruments generally include an internally hollow cutting body, having a size related to the bone site to be made. On an external surface of the cutting body, a plurality of through holes are made, which are provided with sharp and protruding edges, able to carry out a mechanical excavation on the bone.

Currently, the production of the cutting body requires the use of a large number of machinery or apparatuses. This is due both to the complexity of the object to be produced and to the operational limits of the known machines.

Typically, the cutting body is produced starting from an untreated component in metal material, for example, but not only, titanium or steel, and is obtained by deep drawing starting from a flat metal sheet, presenting a more or less complex concave shape at the end of the working.

The untreated component is then fed in sequence to a chip removal machine, a sharpening machine, a grinding machine, and a punching machine to then undergo appropriate washing treatments.

In particular, the chip removal machine is able to produce the aforementioned through holes, any grooves or also to remove edges or working frames. However, the through holes produced do not have an edge already suitable for the purpose of cutting and have to, therefore, be subjected to subsequent sharpening in a specific sharpening machine. The sharpening machine operates on the entire edge of the hole, even in the segment not affected, in use, by the mechanical cutting action. This disproportionately weakens the external surface of the cutting body, also generating excessive waste and dust.

In addition, the need to sharpen the edges of the holes in a machine other than the one that produced them can lead to repositioning errors, excessive waste of time during the machine change, and therefore a decrease in productivity.

The through holes can also be produced using laser cutting apparatuses. This allows to minimise the presence of chips and dust, and to increase productivity. However, such laser cutting apparatuses do not eliminate the need to sharpen the edges of the holes.

There is therefore a need to improve an automated laser cutting station for the production of semi-finished components for prosthetic surgery instruments that can overcome at least one of the drawbacks of the prior art.

In particular, an objective of the present invention is to provide such an automated laser cutting station configured to produce the through holes having already the appropriately sharpened edge.

A further objective of the present invention is to provide such an automated laser cutting station which allows to increase the productivity, and decrease the working waste.

A further objective is to develop a method to produce a semi-finished component in the aforementioned automated laser cutting station.

The Applicant has studied, tested and realised the present invention to overcome the drawbacks of the prior art, and to obtain these and further objectives and advantages.

SUMMARY

The present invention is expressed and characterised in the independent claims. The dependent claims show other features of the present invention or variants of the main solution idea.

The automated laser cutting station in accordance with the present invention may be suitable for insertion into a robotic working line for the automated production of prosthetic surgery instruments.

In accordance with the aforementioned objectives, the automated laser cutting station is suitable for the production of semi-finished components for prosthetic surgery instruments starting from hollow untreated components having at least one external surface. The aforementioned automated station comprises:

at least one first automated operator configured to pick up the untreated components from a storage space and supply them to a laser cutting apparatus comprising:

a cutting chamber in which there is a second automated operator, provided with a laser cutting head configured to execute a plurality of laser cutting workings on one of the aforementioned untreated components to make both holes able to define a cutting part of the surgical instrument, and optional auxiliary apertures functional for the subsequent workings, and a rotating mandrel configured to retain the aforementioned untreated component and mounted on movement means able to dispose the rotating mandrel on each occasion inside the aforementioned cutting chamber, a control unit at least configured to move the second automated operator in order to orient the laser cutting head along a cutting path for cutting each hole to be made, the laser beam emitted to produce at least said hole being inclined with respect to the external surface of the untreated component being worked.

According to an aspect of the present invention, the laser cutting head is controlled so that each hole is peripherally defined by a first edge, wherein the laser cutting head is inclined by a first cutting angle, with respect to a reference plane tangent to the external surface passing through the centre of the hole to be made, and by a second edge, complementary to the first edge, wherein the laser cutting head is inclined by a second cutting angle, with respect to said reference plane.

According to an aspect of the present invention, the second cutting angle is different from the first cutting angle, in particular it is smaller. In addition, the first angle is comprised between about 80° and about 110°, while the second angle is comprised between about 20° and about 40°. In a preferred solution, the first cutting angle is about 90°, while the second cutting angle is about 30°.

According to embodiments, a method to produce such semi-finished components is provided. The method provides at least to:

pick up, by means of the first automated operator, at least one untreated component at a time from the storage space to position it on the rotating mandrel;

move the rotating mandrel by means of the movement means so as to dispose it inside the cutting chamber;

execute, by means of the second automated operator provided with the laser cutting head, a plurality of laser cutting workings to make both the holes able to define the cutting part of the surgical instrument and optional auxiliary apertures functional for the subsequent workings; the laser cutting head is moved and oriented along a cutting path for cutting each hole to be made, so that the laser beam emitted to produce at least one edge of the aforementioned hole is inclined with respect to the external surface of the untreated component being worked.

Embodiments disclosed herein also refer to the semi-finished component obtained in the aforementioned automated station and in accordance with the method disclosed above. This semi-finished component comprises:

at least one cutting part delimited by an external surface and an opposite internal surface, the aforementioned cutting part being provided with a plurality of through holes and wherein each hole has a first edge and a complementary second edge having different inclinations;

an auxiliary band associated peripherally with said cutting part and on which there are optional auxiliary apertures functional for the subsequent workings.

BRIEF DESCRIPTION OF THE DRAWINGS

These and other aspects, features and advantages of the present invention will become clear from the following embodiment disclosure, given as a non-limiting example, with reference to the attached drawings in which.

To facilitate understanding, identical reference numbers have been used, where possible, to identify identical common elements in the figures. It is to be understood that elements and features of an embodiment can be conveniently combined or incorporated into other embodiments without further clarification.

DETAILED DESCRIPTION

Reference will now be made in detail to the possible embodiments of the invention, one or more examples of which are shown in the attached figures by way of non-limiting example. The phraseology and terminology used herein is also for non-limiting exemplary purposes.

Figure 1:
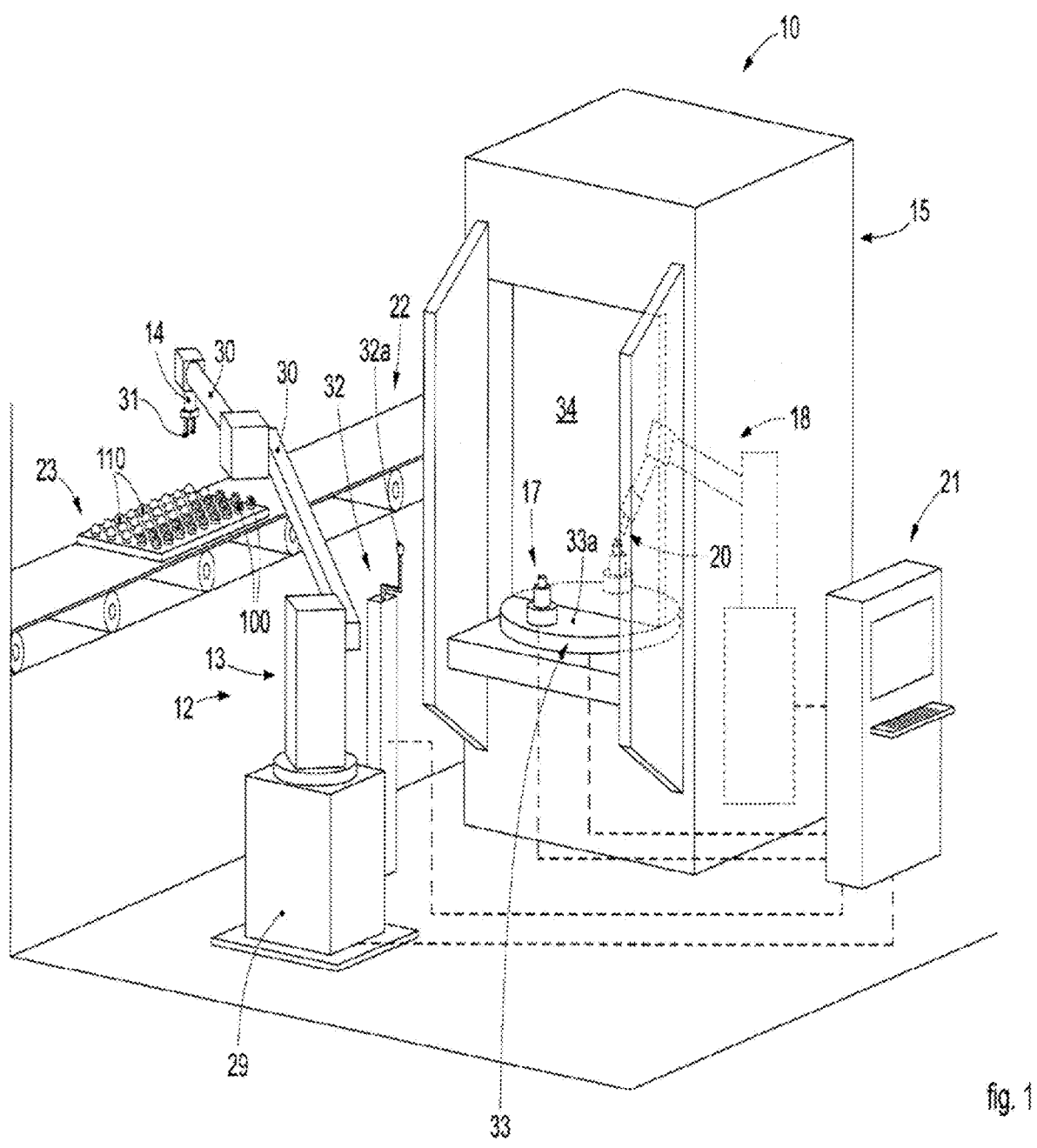
FIG. 1 is a schematic perspective view of an automated laser cutting station according to embodiments disclosed herein.
Figures 2, 3:
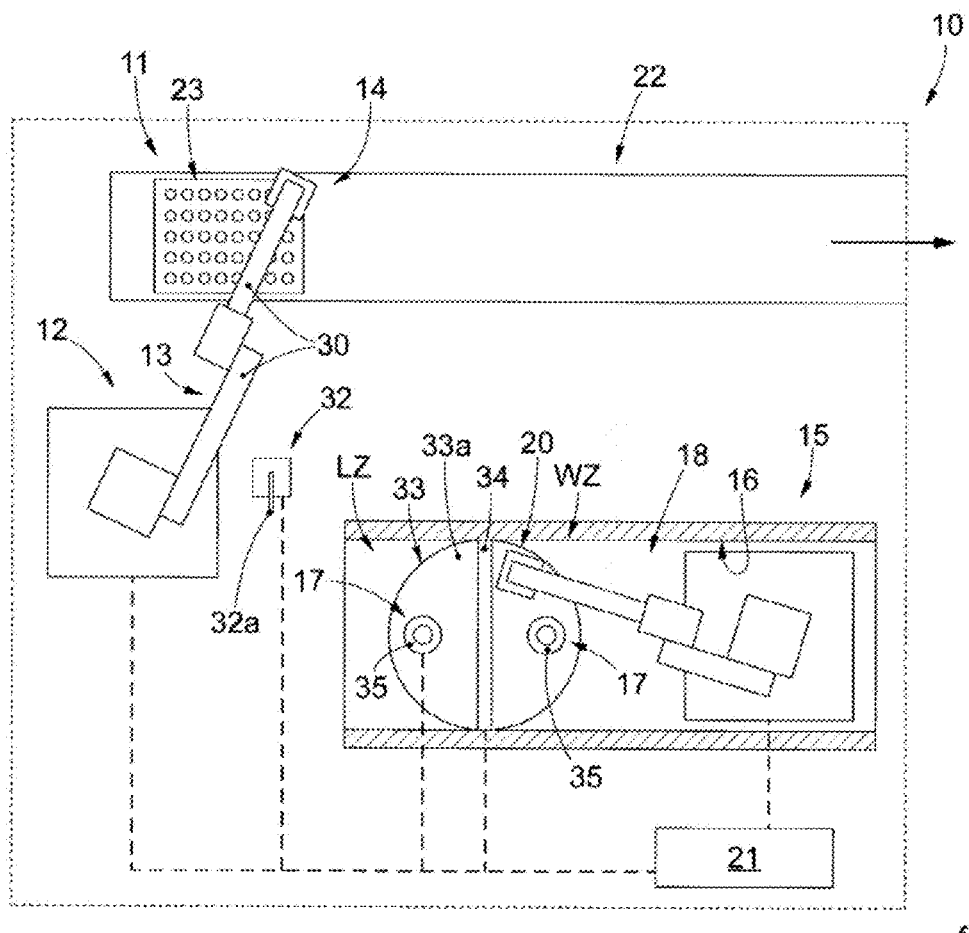
FIG. 2 is a schematic top view of FIG. 1.
FIG. 3 is a perspective view of an enlarged detail of the storage space visible in FIGS. 1-2.
Figures 8, 9, 10, 11, 12:
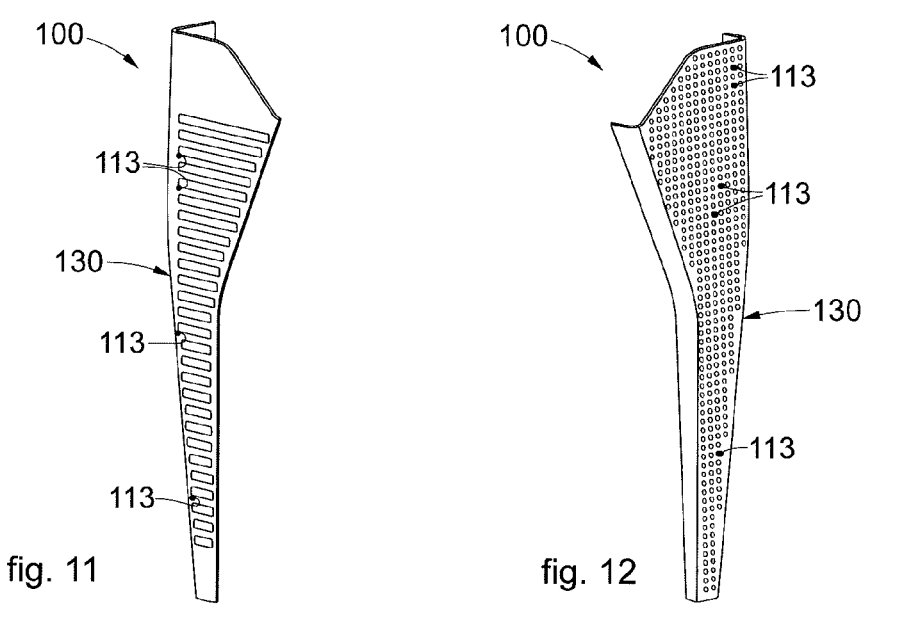
FIG. 8 shows a schematic sectional view of the rotating mandrel which retains an untreated component.
FIG. 9 is a side view of a possible untreated component which has a spherical cap shape.
FIG. 10 is a side view of a possible semi-finished component obtained from the untreated component of FIG. 9.
FIGS. 11-12 are perspective views of additional possible semi-finished components obtainable in the automated station of FIGS. 1-2.

Embodiments, shown in FIGS. 1-2, relate to an automated station 10 for the production of semi-finished components 100, illustrated by way of example in FIGS. 10-12, for prosthetic surgery instruments for the removal of material which can be, for example, acetabular cutters, patellar cutters, glenoid cutters, rasps, broaches or similar cutting instruments having the most disparate shapes.

The semi-finished component 100 is obtained starting from a hollow untreated component 110, i.e. unfinished, which has at least one external surface 111 and at least one opposite internal surface 112 substantially continuous, see for example FIG. 9.

Untreated component 110 means an unfinished component obtained by a drawing, bending or similar operation to obtain an object having at least one substantially concave wall.

The untreated component 110 can be drawn from a flat metal sheet and, as a result, has a concave shape, more or less complex.

Due to the process with which it is made, the untreated component 110 may have a substantially flat perimeter edge, or flange, 114 that will need to be removed.

With particular reference to FIG. 9, the untreated component 110 has, by way of example, a hemispherical shape, while the semi-finished components 100 of FIGS. 11-12 are made starting from respective untreated components which have a box shape, in two halves.

Here and hereinafter, reference will be made generically to the semi-finished component 100 and the untreated component 110 with the abbreviated term component 100, 110 when they are equivalent/substitutable within the sentence or context.

According to embodiments, shown in FIGS. 1-2, the automated station 10 comprises at least one first automated operator 12 configured to pick up the untreated components 110, for example one at a time, from a storage space 11 and supply them to a laser cutting apparatus 15.

The laser cutting apparatus 15 comprises, in turn, a cutting chamber 16, FIG. 2, inside which there is a second automated operator 18 provided with a laser cutting head 20 configured to execute a plurality of laser cutting workings on the untreated components 110 to make both holes 113 able to define a cutting part 130 of the surgical instrument, and auxiliary apertures 117, 118, 120 functional for the subsequent workings, as will be disclosed in more detail below.

The laser cutting apparatus 15 also comprises a rotating mandrel 17 configured to retain the aforementioned untreated component 110. The rotating mandrel 17 is mounted on movement means 33 able to dispose the rotating mandrel 17 on each occasion inside the cutting chamber 16.

The automated station 10 also comprises a control unit 21 configured to move the second automated operator 18 in order to orient the laser cutting head 20 along a cutting path 140 for cutting each hole 113 to be made. In particular, the laser beam emitted to produce at least one edge 115, 116 of the hole 113 is inclined with respect to the external surface 111 of the untreated component 110 being worked.

In particular, each hole 113 is peripherally defined by a first segment, or edge, 115 wherein the laser cutting head 20 is inclined by a first cutting angle $\alpha 1$ with respect to a reference plane P tangent to the external surface 111 passing through the centre 150 of the hole 113, and by a complementary second segment, or edge, 116, wherein the laser cutting head 20 is inclined by a second cutting angle $\alpha 2$ with respect to the aforementioned reference plane P. The second edge 116 is the one that, in use, defines the cutting edge.

According to embodiments, the second angle $\alpha 2$ is different from the first angle $\alpha 1$, in particular smaller. The first angle $\alpha 1$ may be comprised between about 80° and about 110°, preferably about 90°. The second angle $\alpha 2$ may be comprised between about 20° and about 40°, preferably about 30°.

According to embodiments, the holes 113 may have any shape, but typically have a circular (FIG. 12), elliptical (FIG. 10), rectangular (FIG. 11) or square shape.

The laser cutting head 20 thus moved by the control unit 21 makes it possible to define, directly during the cutting operation, an already sharpened second edge 116. This edge 116, after punching operation in a subsequent working station that will make it protruding, will be able, in use, to carry out a mechanical excavation on the bone.

In addition, making the holes 113 starting from the external surface 111 allows to obtain even very complex cutting profiles, an objective difficult to achieve in reasonable times with the current chip removal working machines.

This solution also makes it possible to obtain a more robust semi-finished component 100, since the lightening of material is limited only to the second edge 116.

The automated station 10 disclosed herein allows, therefore, to reduce the working times, since such use of the laser cutting head 20 eliminates the need for subsequent sharpening operations of the second edges 116 of the holes 113.

According to embodiments, in the execution of said hole 113 the control unit 21 is configured to move the laser cutting head 20 so that the latter:

aligns vertically above the centre 150 of the hole 113 which has to be made, to then move toward a first attack point A to produce the first edge 115, executes a cut inclined by the first cutting angle $\alpha 1$ which goes from the first attack point A to a second attack point B in correspondence with which the second edge 116 begins, continuously executes a cut inclined by the second cutting angle $\alpha 2$ which goes from the second attack point B to a third attack point C in correspondence with which the second edge 116 ends, continuously executes a cut inclined by the first cutting angle $\alpha 1$ which goes from the third attack point C to the first attack point A to finish the production of the first edge 115, and therefore of the hole 113.

According to embodiments, shown in FIGS. 1-3, the storage space 11 is able to accommodate a plurality of the aforementioned components 100, 110, and comprises at least one tray 23 having a support plane 24, on which there are a plurality of modular positioning elements 25, each of which is associated with the support plane 24 by means of appropriate holes defined on the latter.

Each modular positioning element 25 is able to position in a desired manner a respective component 100, 110. For example, such modular positioning elements 25 may be disposed according to a desired positioning matrix.

The positioning elements 25 may be associated with one or more adaptor elements 26 which have shapes and dimensions consistent with the component 100, 110 that they must retain in position.

According to embodiments, illustrated in FIG. 3, in the case of untreated components 110 having a spherical cap shape, intended, for example, for the production of acetabular cutters, the modular positioning elements 25 can comprise a central body 28a of cylindrical shape projecting from the support plane 24, with which a plurality of rings 28b having gradually decreasing diameter can be associated. For example, it is possible to provide that a first base ring 28b supports the flange 114 of the untreated component 110, while one or more additional rings 28b, of gradually smaller diameters aligned above, contact the internal surface 112. The identification of the modular positioning elements 25 and/or the rings 28b can occur thanks to specific RFID identification labels associated with each of them.

According to embodiments, the tray 23 may be associated with an RFID radio frequency type identification label 27, on which information relating to the components 100, 110 supported by it is stored, FIG. 3. The aforementioned information may relate to the type, dimension or size of the untreated components 110, as well as to an identifier of completed working or similar information.

According to other embodiments, a respective identification label 27 can be associated with each position defined on the tray 23.

According to possible embodiments, the tray 23 can have, for example on the sides of the support plane, specific gripping elements (not shown) in order to be manipulated and be moved in an automated manner, for example, toward a subsequent working station.

According to a possible embodiment, the tray 23 can be disposed in support on linear movement means, for example a conveyor belt 22, as illustrated by way of example in FIGS. 1-2.

According to a variant, the tray 23 can be disposed in support, i.e. associated above, to a support structure that can comprise vertical and horizontal support elements, so as to define a shape that resembles that of the frame of a table.

According to possible embodiments, two or more separate trays 23 are provided, of which at least a first of said trays 23 can be used to support the untreated components 110, and at least a second of said trays 23 can be able to receive and support the semi-finished components 100 at the exit from the cutting chamber 16. Alternatively, the second tray 23 can be used as an operational "lung" in order to ensure that the automated station 10 works continuously and without interruptions.

According to further possible embodiments, the storage space 11 can comprise a chest of drawers formed by a plurality of trays 23, disposed vertically aligned and associated with an appropriate support structure. This solution allows the containment of a very large number of components 100, 110, for example up to 600 pieces and more.

According to embodiments, the automated station 10 also comprises measuring means 32 able to detect on each occasion a reference measurement of the untreated component 110 to allow a correct positioning thereof on the rotating mandrel 17. It should be noted that this reference measurement can also be executed outside the automated station 10, for example in the specific measurement and testing station.

As shown in FIGS. 1-2, the measuring means 32 may be operatively connected to the control unit 21, and comprise a measuring head, or stylus, 32a provided with a terminal probe able to execute a contact type measurement and to transmit the detected reference measurement to the control unit 21. The measuring head 32*a* may be mobile or fixed, as in the case disclosed herein.

When the control unit 21 receives the signal containing the reference measurement of the untreated component 110 to be worked, it transmits an operating signal to the first automated operator 12, so that the latter can dispose the untreated component 110 on the rotating mandrel 17 at a correct height; the position of the untreated component 110 is therefore completely defined for the subsequent cutting operation.

According to embodiments, the first automated operator 12 is disposed in the space, so as to cooperate at least with the storage space 11, with the measuring means 32, and with the laser cutting apparatus 15.

With particular reference to FIGS. 1-2, the first automated operator 12 comprises a fixed base platform 29 on which the robotic articulated arm 13 is rotatably associated.

The robotic articulated arm 13 comprises a plurality of elements 30 rotatably articulated with respect to each other in succession, so as to allow the movement of the robotic articulated arm 13 according to a number of degrees of freedom sufficient to allow the first automated operator to carry out all the necessary manipulations and positioning. In the present case, the robotic articulated arm 13 may be moved according to six degrees of freedom.

According to embodiments, shown in FIG. 1, the robotic articulated arm 13 is provided with a manipulation head 14 connected to a gripping tool 31. The gripping tool 31 is able to pick up an untreated component 110 from the tray 23 and hold it to dispose it on the rotating mandrel 17, and to pick up, at the end of the working, the finished semi-finished component 100 from the rotating mandrel 17 and dispose it on the tray 23.

According to embodiments, the first automated operator 12 is able to cooperate with the measurement means 32 by bringing each untreated component 110 to a measurement position before disposing it on the rotating mandrel 17.

According to embodiments, illustrated in FIG. 2, the laser cutting apparatus 15 has a front loading/unloading zone LZ of the components 100, 110, and a rear working zone WZ, not directly accessible, where the second automated operator 18 is disposed. The rear working zone WZ is located inside the cutting chamber 16. The loading/unloading zone LZ and the working zone WZ can be separated by a septum 34, which can be fixed or mobile.

According to embodiments, the rotating mandrel 17 may be permanently fixed to the movement means 33. With reference to the example disclosed herein, the movement means 33 are configured as a rotating table 33*a*, and the rotating mandrel 17 is fixed on it in a peripheral position.

The table 33*a* is able to rotate in order to bring on each occasion the rotating mandrel 17 from the loading/unloading zone LZ to the working zone WZ, and vice versa.

According to embodiments, the rotating table 33*a* may support two rotating mandrels 17, disposed in a diametric position, where a first rotating mandrel 17 is located in the loading/unloading zone LZ to receive an untreated component 110, and a second rotating mandrel 17 is located in the working zone WZ to support another untreated component 110 during the cutting operation.

According to embodiments, shown in FIG. 8, the rotating mandrel 17 comprises a rotating base 35 and a plurality of expansion jaws 36 able to retain the component 100, 110 with respect to the internal surface 112 thereof or also with respect to the external surface 111 thereof.

The rotating mandrel 17 allows the untreated component 110 being worked to be rotated along a vertical axis Z, FIG. 8.

According to embodiments, opening and closing of the jaws 36 of the rotating mandrel 17 is pneumatically controlled by the control unit 21 which, upon receiving the operating signal of correct positioning of the untreated component 110 on the rotating mandrel 17 by the first automated arm 12, controls the expansion of the jaws 36 and the exit of the first automated arm 12 from the cutting chamber 16.

According to embodiments, the laser cutting head 20 is mobile on three cutting axes X', Y', Z' and is rotatable around at least one of the cutting axes X', Y', always remaining facing the external surface 111 of the untreated component 110 being worked, FIGS. 4-7.

The rotation along one of the cutting axes X', Y' allows the cutting operation to be carried out even on bodies having a very complex geometry.

Overall, therefore, the cutting working on the untreated component 110 can occur according to five degrees of freedom, one of which is defined by the rotation of the rotating mandrel 17 and the other four by the movements of the laser cutting head 20.

According to embodiments, the laser cutting head 20 has a terminal nozzle 37 which conveys the laser beam on the untreated component 110 being worked. The nozzle 37, in addition to conveying the laser beam, also performs the function of distance/position sensor, which may be, by way of example, a capacitive type sensor, instantly adapting the distance of the laser cutting head 20 from the untreated component 110 being worked. For example, the nozzle 37 may be made of copper.

The cutting chamber 16 is associated with devices (not shown) able to ensure the correct functioning of the laser. In particular, there are a laser source, an aspiration device, a cooling device, and the like.

According to embodiments, the laser cutting head 20 is configured to also define a plurality of auxiliary apertures 117, 118, 120. Such auxiliary apertures comprise gripping holes 117, which are for the manipulation of the semi-finished component 100 in subsequent working stations, one or more centring notches 118 able to define a reference for subsequent workings, and a possible pre-cut 120 able to allow the subsequent separation of a portion of the semi-finished component 100.

The semi-finished component 100 therefore comprises at least one cutting part 130 delimited by an external surface 111 and an opposite internal surface 112, wherein the cutting part 130 is provided with a plurality of the aforementioned holes 113 passing from the external surface 111 to the internal surface 112. Each hole 113 has a first edge 115 and a complementary second edge 116 having different inclinations.

The semi-finished component 100 also comprises an auxiliary band 119 associated peripherally with, and in continuity with, the cutting part 130 and on which the aforementioned auxiliary apertures 117, 118, 120 are optionally present.

With reference to the example illustrated in FIG. 10, in the case of untreated components 110 having a spherical cap shape, the gripping holes 117 can be disposed in pairs, in a diametric position offset by about 90°, FIGS. 10-11.

Both the flange 114, present in the initial untreated component 110, and the auxiliary band 119 will be removed: the first during the cutting operation, the second at the end of all the subsequent workings following those carried out in the automated station 10. However, already inside the automated station 10 the aforementioned pre-cut 120 is executed, so as to facilitate the subsequent removal of the auxiliary band 119.

In particular, the pre-cut 120 is defined by a plurality of perimeter slits 120a spaced from each other to define a line of interruptions so as to leave, between them, respective portions of material 120b which allow to maintain the connection of the auxiliary band 119 with the remaining part of the semi-finished component 100.

According to embodiments, a method to produce such semi-finished components 100 is provided. The method provides at least to:

pick up, by means of the first automated operator 12, at least one untreated component 110 at a time from the storage space 11 to position it on the rotating mandrel 17;

move the rotating mandrel 17 by means of the movement means 33 so as to dispose it inside the cutting chamber 16;

execute, by means of the second automated operator 18 provided with the laser cutting head 20, a plurality of laser cutting workings on the untreated component 110 to make both the holes 113 able to define the cutting part 130 of the surgical instrument, and the optional auxiliary apertures 117, 118, 120 functional for the subsequent workings; the laser cutting head 20 is moved and oriented along the cutting path 140 for cutting each hole 113 to be made, so that the laser beam emitted to produce at least a first edge 115 or a second edge 116 of the hole 113 is inclined with respect to the external surface 111 of the untreated component 110 being worked.

Before executing the holes 113, even if this order is not binding, the laser cutting head 20 removes the flange 114. For example, the flange 114 is separated into sectors, and subsequently the perimeter cut that removes these sectors is operated.

According to embodiments, shown in FIGS. 4-7, the steps to produce a hole 113 are disclosed. By way of non-limiting example, the example relates to an untreated component 110 having a spherical cap shape, and to a hole 113 having an elliptical shape.

Figure 4:
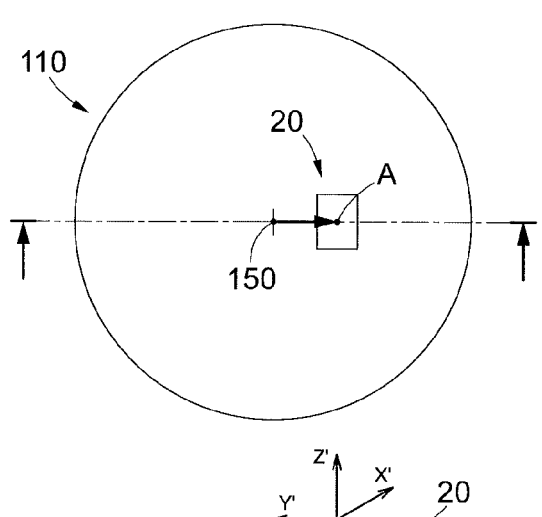
FIGS. 4-7 are schematic views illustrating the operational steps for the production of a hole.
Figure 4:
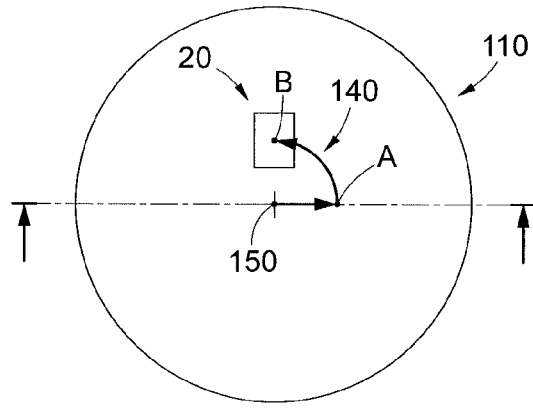
Figure 4:
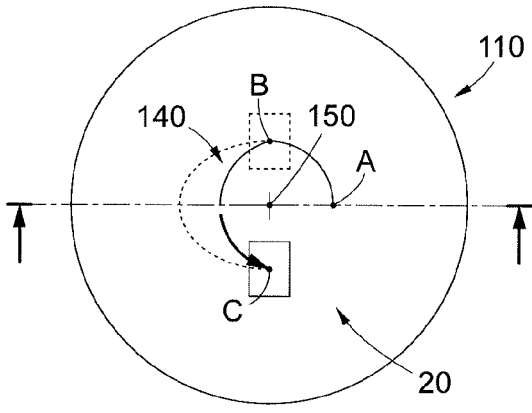
Figure 4:
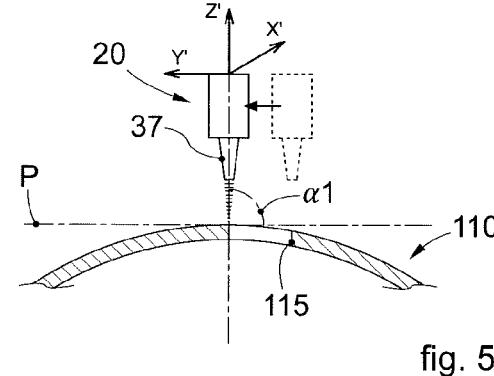

In a first step, FIG. 4, the laser cutting head 20 is positioned vertically above the centre 150 of the hole 113 to be made, then moving toward a first attack point A for the production of the first edge 115. In particular, the first attack point A is in an opposite position with respect to the second edge 116, so that any working start trimming does not damage the second edge 116 which is the cutting edge.

Figure 5:
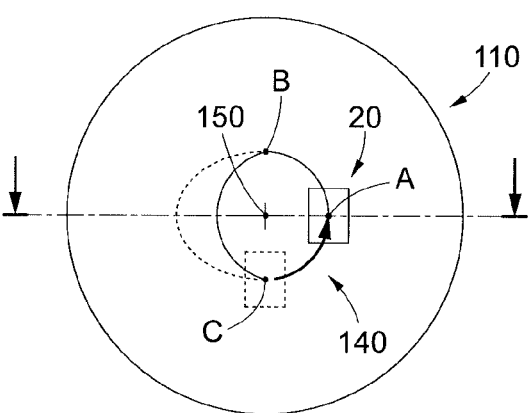

In a second step, FIG. 5, the laser cutting head 20 executes a cut inclined by the first angle α1 which goes from the first attack point A to a second attack point B in correspondence with which the second edge 116 begins. In the present case, the angle α1 is about 90°.

Figure 6:
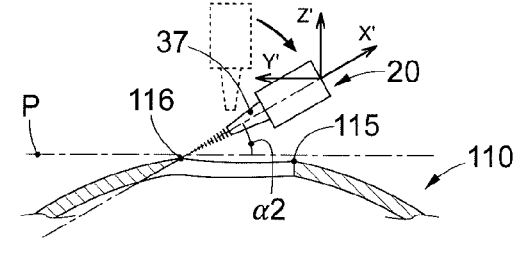

In a third step, FIG. 6, the laser cutting head 20 executes a cut inclined by the second angle α2 which goes from the second attack point B to a third attack point C in correspondence with which the second edge 116 ends. In the present case, the angle α2 is about 30°. Such an angle allows to define a cutting edge already suitable for the surgical cutting operation unless the elimination of any working burrs.

Figure 7:
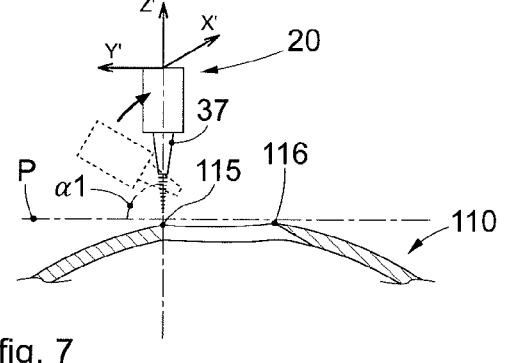

In a fourth step, FIG. 7, the laser cutting head 20 executes a cut inclined by the first angle α1 which goes from the third attack point C to the first attack point A to finish the production of the first edge 115.

After the holes 113 have been executed, even if this order is not binding, the gripping holes 117 and the centring notch 118 are made.

Subsequently, the pre-cut 120 which may have an appropriate shaped profile is made.

It is clear that modifications and/or additions of parts or steps can be made to the automated station 10 for the production of semi-finished components 100 for prosthetic surgery instruments, the semi-finished component 100, and the relative production method disclosed so far, without departing from the scope of the present invention as defined by the claims.

In the following claims, the references in parentheses have the sole purpose of facilitating reading and must not be considered as limiting factors as regards the scope of protection underlying the specific claims.

The invention claimed is:

1. An automated laser cutting station for the production of semi-finished cutting components for prosthetic surgery instruments, wherein said automated laser cutting station comprises:

at least one first automated operator configured to pick up hollow untreated components from a storage space and supply them to:

a laser cutting apparatus having a front loading zone and a rear working zone, the laser cutting apparatus further comprising:

a cutting chamber in which there is allocated a second automated operator, provided with a laser cutting head to make holes able to define a cutting part of said prosthetic surgery instrument on each of said untreated components, and a rotating mandrel configured to retain each of said untreated components on the rotating mandrel, wherein in response to rotation of the rotating mandrel the untreated component retained on the rotating mandrel rotates about its vertical Z axis, the rotating mandrel further being mounted to and positioned adjacent a periphery of a rotating table, and wherein the rotating table rotates to position the rotating mandrel having the untreated component received from the first automated operator retained thereon from the front loading zone disposed outside the cutting chamber, to the rear working zone disposed within the cutting chamber, the front loading zone and the rear working zone being separated by a fixed or movable septum;

a control unit configured to move said second automated operator in order to orient said laser cutting head along a cutting path for cutting each hole to be made, with respect to an external surface of the untreated component, wherein the control unit is arranged to move the laser cutting head on three cutting axes (X', Y', Z'), with the control unit further arranged to rotate the laser cutting head about at least one of the three cutting axes; and wherein said laser cutting head is inclined by a first cutting angle, with respect to a reference plane tangent to the external surface passing through a center of the hole, to define a first edge of said hole, and is inclined by a second cutting angle with respect to said reference plane to define a second edge of said hole; and further wherein the rotating mandrel includes a rotating base, and a plurality of expansion jaws operatively coupled to the rotating base and arranged to retain the untreated component on the rotating base.

2. The automated laser cutting station as in claim 1, wherein said first angle is comprised between about 80° and about 110°, said second angle is comprised between about 20° and about 40°.

3. The automated laser cutting station as in claim 2, wherein when making said hole, said control unit is configured to move said laser cutting head so that:

it aligns vertically above the center of the hole which has to be made, to then move toward a first attack point to produce said first edge, it executes a cut inclined by the first cutting angle which goes from the first attack point to a second attack point in correspondence with which the second edge begins, it executes a cut inclined by the second cutting angle which goes from the second attack point to a third attack point in correspondence with which the second edge ends, it executes a cut inclined by the first cutting angle which goes from the third attack point to the first attack point to finish the production of the first edge.

4. The automated laser cutting station as in claim 1, wherein said automated station comprises measuring means configured to cooperate with said first automated operator to detect, on each occasion, a reference measurement of one of said untreated components to allow a correct positioning thereof on said rotating mandrel, and further wherein the rotating mandrel includes a plurality of jaws arranged to secure the untreated components to the rotating mandrel.

5. The automated laser cutting station as in claim 1, wherein said storage space comprises at least one tray having a support plane on which there are a plurality of modular positioning elements and at least one identification label, wherein with said modular positioning elements there are associated one or more adaptor elements which have shapes and sizes consistent with the shape of said components.

6. A method to produce semi-finished components for prosthetic surgery cutting instruments starting from hollow untreated components that have at least one external surface, said method comprising:

providing a rotating table having a periphery and a rotating base;

providing a mandrel adjacent the periphery of the rotating table, the mandrel being rotatable about a vertical Z axis;

using a first automated operator to pick up at least one untreated component at a time from a storage space to position it on the mandrel disposed in a front loading zone inside a laser cutting apparatus;

moving the mandrel using the rotating table so as to move the untreated component from the loading zone to a rear working zone disposed inside a cutting chamber of said laser cutting apparatus;

providing expansion jaws operatively coupled to the rotatable base to secure the untreated component on the mandrel, and providing a fixed or movable septum between the front loading zone and the rear working zone;

rotating the mandrel to rotate the at least one untreated component about its Z axis to position the at least one untreated component in a defined position;

providing a control unit arranged to move the laser cutting head on three cutting axes (X', Y', Z'), with the control unit further arranged to rotate the laser cutting head about at least one of the three cutting axes; and executing, using a second automated operator provided with a laser cutting head, a plurality of laser cutting workings on said untreated component to make holes able to define a cutting part of said surgical instrument, said laser cutting head being moved and oriented along a cutting path for cutting each hole with respect to the external surface of the untreated component being worked.

7. The method as in claim 6, wherein making said at least one hole comprises the following steps:

a first step, in which said laser cutting head is positioned vertically above a center of the hole which has to be made, to then move toward a first attack point to make a first edge of said hole, a second step, in which the laser cutting head executes a cut inclined by a first cutting angle which goes from the first attack point to a second attack point in correspondence with which a second edge of said hole begins;

a third step, in which the laser cutting head executes a cut inclined by the a second cutting angle which goes from the second attack point to a third attack point in correspondence with which the second edge ends;

a fourth step, in which the laser cutting head executes a cut inclined by the first cutting angle which goes from the third attack point to the first attack point to finish the production of the first edge.

8. The automated laser cutting station as in claim 1, and further wherein the controller is arranged to have the laser cutting head cut auxiliary apertures on each of said untreated components, and wherein the auxiliary apertures comprise gripping holes, the gripping holes for manipulating the semi-finished component.

9. The method as in claim 6, including further arranging the controller to have the laser cutting head cut auxiliary apertures, wherein the auxiliary apertures comprise gripping holes, the gripping holes for manipulating the semi-finished component.

* * * * *